United States Patent
Mitsuyasu et al.

(10) Patent No.: US 12,497,127 B2
(45) Date of Patent: Dec. 16, 2025

(54) CALIPER ADAPTOR AND DISC BRAKE CALIPER ASSEMBLY FOR HUMAN-POWERED VEHICLE

(71) Applicant: SHIMANO INC., Sakai (JP)

(72) Inventors: Kento Mitsuyasu, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 442 days.

(21) Appl. No.: 18/073,453

(22) Filed: Dec. 1, 2022

(65) Prior Publication Data

US 2024/0182133 A1 Jun. 6, 2024

(51) Int. Cl.
  *B62L 1/00* (2006.01)
(52) U.S. Cl.
  CPC .................. *B62L 1/005* (2013.01)
(58) Field of Classification Search
  CPC ..................................... B62L 1/005
  USPC ............................... 188/24.11, 26
  See application file for complete search history.

(56) References Cited

U.S. PATENT DOCUMENTS

| | | | |
|---|---|---|---|
| 5,957,244 A | 9/1999 | Turner | |
| 6,386,328 B1 | 5/2002 | Chen | |
| 9,227,465 B2 * | 1/2016 | Nakajima | B60B 27/026 |
| 2017/0009833 A1 * | 1/2017 | Gallagher | B62L 1/00 |
| 2020/0292018 A1 * | 9/2020 | Ishizaki | F16D 65/0075 |
| 2022/0194513 A1 | 6/2022 | Heyna et al. | |
| 2023/0166807 A1 * | 6/2023 | Heyna | B62K 19/38 |
| 2023/0211850 A1 * | 7/2023 | Piccirillo | F16D 65/0056 303/121 |

FOREIGN PATENT DOCUMENTS

| | | |
|---|---|---|
| CN | 113137440 | 7/2021 |
| DE | 10 2022 131 767 | 6/2023 |

* cited by examiner

*Primary Examiner* — Christopher P Schwartz
(74) *Attorney, Agent, or Firm* — MORI & WARD, LLP

(57) ABSTRACT

A caliper adaptor for a disc brake caliper of a human-powered vehicle comprises an axle coupling portion, a caliper mounting portion, and a frame coupling portion. The axle coupling portion is configured to be coupled to a hub axle of a hub assembly of the human-powered vehicle. The hub axle extends along a rotational axis of the hub assembly. The caliper mounting portion is configured to mount the disc brake caliper. The caliper mounting portion includes a caliper mounting hole. The caliper mounting hole has a caliper-mounting center axis. The caliper-mounting center axis extends along a reference plane perpendicular to the rotational axis. The frame coupling portion is configured to be coupled to a vehicle body of the human-powered vehicle. The frame coupling portion is at least partially provided radially outwardly of the caliper mounting portion relative to the rotational axis.

24 Claims, 12 Drawing Sheets

CALIPER ADAPTOR AND DISC BRAKE CALIPER ASSEMBLY FOR HUMAN-POWERED VEHICLE

BACKGROUND

Technical Field

The present invention relates to a caliper adaptor and a disc brake caliper assembly for a human-powered vehicle.

Background Information

A human-powered vehicle includes a disc brake rotor and a disc brake caliper. The disc brake caliper is arranged in a position corresponding to an outer radius of the disc brake rotor. The disc brake caliper is mounted to a frame of the human-powered vehicle using fasteners. The frame includes a threaded hole threadedly engaged with the fastener or an unthreaded hole through which the fastener extends. One of objects of the present disclosure is to simplify a structure coupling the disc brake caliper and a vehicle body of the human-powered vehicle.

SUMMARY

In accordance with a first aspect of the present invention, a caliper adaptor for a disc brake caliper of a human-powered vehicle comprises an axle coupling portion, a caliper mounting portion, and a frame coupling portion. The axle coupling portion is configured to be coupled to a hub axle of a hub assembly of the human-powered vehicle. The hub axle extends along a rotational axis of the hub assembly. The caliper mounting portion is configured to mount the disc brake caliper. The caliper mounting portion includes a caliper mounting hole. The caliper mounting hole has a caliper-mounting center axis. The caliper-mounting center axis extends along a reference plane perpendicular to the rotational axis. The frame coupling portion is configured to be coupled to a vehicle body of the human-powered vehicle. The frame coupling portion is at least partially provided radially outwardly of the caliper mounting portion relative to the rotational axis.

With the caliper adaptor according to the first aspect, it is possible to simplify the structure of the vehicle body by coupling the caliper adaptor and the hub axle of the hub assembly via the axle coupling portion.

In accordance with a second aspect of the present invention, the caliper adaptor according to the first aspect is configured so that a first distance is defined between the axle coupling portion and the frame coupling portion. A second distance is defined between the axle coupling portion and the caliper mounting portion. The first distance is longer than the second distance.

With the caliper adaptor according to the second aspect, it is possible to reduce a rotational force applied to the frame coupling portion. Thus, it is possible to reliably simplify the structure of the vehicle body.

In accordance with a third aspect of the present invention, the caliper adaptor according to the first or second aspect is configured so that the frame coupling portion is at least partially provided radially outwardly of the axle coupling portion relative to the rotational axis.

With the caliper adaptor according to the third aspect, it is possible to reduce a rotational force applied to the frame coupling portion. Thus, it is possible to reliably simplify the structure of the vehicle body.

In accordance with a fourth aspect of the present invention, the caliper adaptor according to any one of the first to third aspects is configured so that the caliper mounting portion is at least partially provided radially outwardly of the axle coupling portion relative to the rotational axis.

With the caliper adaptor according to the fourth aspect, it is possible to arrange the disc brake caliper depending on a size of a disc brake rotor. Thus, it is possible to simplify the structure of the vehicle body while improving flexibility of arrangement of the disc brake caliper.

In accordance with a fifth aspect of the present invention, the caliper adaptor according to any one of the first to fourth aspects is configured so that the frame coupling portion includes a frame coupling hole in which a protrusion of the vehicle body is to be at least partially provided. The frame coupling hole is at least partially provided radially outwardly of the caliper mounting portion relative to the rotational axis.

With the caliper adaptor according to the fifth aspect, it is possible to simplify the structure of the frame coupling portion using the frame coupling hole and the protrusion of the vehicle body. Thus, it is possible to simplify the structures of the vehicle body and the caliper adaptor.

In accordance with a sixth aspect of the present invention, the caliper adaptor according to the fifth aspect is configured so that the frame coupling hole has a first diameter. The caliper mounting hole has a second diameter. The first diameter is larger than the second diameter.

With the caliper adaptor according to the sixth aspect, it is possible to make a size of the protrusion of the vehicle body larger. Thus, it is possible to simplify the structure of the vehicle body while improving strength of the protrusion of the vehicle body.

In accordance with a seventh aspect of the present invention, the caliper adaptor according to the fifth or sixth aspect is configured so that the caliper mounting hole includes an internal threaded portion configured to engage with a caliper fastener configured to fasten the disc brake caliper to the caliper adaptor.

With the caliper adaptor according to the seventh aspect, it is possible to couple the disc brake caliper and the caliper mounting portion with a comparatively simple structure. Thus, it is possible to simplify the structures of the vehicle body and the caliper adaptor.

In accordance with an eighth aspect of the present invention, the caliper adaptor according to the fifth or sixth aspect is configured so that the caliper mounting hole is configured not to engage with a caliper fastener configured to fasten the disc brake caliper to the caliper adaptor.

With the caliper adaptor according to the eighth aspect, it is possible to simplify the structures of the vehicle body and the caliper adaptor.

In accordance with a ninth aspect of the present invention, the caliper adaptor according to any one of the fifth to eighth aspects is configured so that the axle coupling portion includes an axle coupling hole in which the hub axle is to be at least partially provided. The frame coupling hole is at least partially provided radially outwardly of the axle coupling hole relative to the rotational axis.

With the caliper adaptor according to the ninth aspect, it is possible to simplify the structure of the axle coupling portion using the axle coupling hole and the hub axle of the hub assembly. Thus, it is possible to simplify the structures of the vehicle body and the caliper adaptor.

In accordance with a tenth aspect of the present invention, the caliper adaptor according to the ninth aspect is configured so that the caliper mounting portion is at least partially provided radially outwardly of the axle coupling hole relative to the rotational axis.

With the caliper adaptor according to the tenth aspect, it is possible to arrange the disc brake caliper depending on a size of a disc brake rotor. Thus, it is possible to simplify the structure of the vehicle body while improving flexibility of arrangement of the disc brake caliper.

In accordance with an eleventh aspect of the present invention, the caliper adaptor according to any one of the first to tenth aspects is configured so that the frame coupling portion includes a frame coupling hole in which a protrusion of the vehicle body is to be at least partially provided. The frame coupling hole has a frame-coupling center axis. The frame-coupling center axis is non-parallel to the caliper-mounting center axis.

With the caliper adaptor according to the eleventh aspect, it is possible to simplify the structure of the vehicle body while design flexibility of the frame coupling portion and the caliper mounting portion.

In accordance with a twelfth aspect of the present invention, the caliper adaptor according to the eleventh aspect is configured so that the axle coupling portion includes an axle coupling hole in which the hub axle is to be at least partially provided. The axle coupling hole has an axle-coupling center axis. The axle-coupling center axis is non-parallel to the caliper-mounting center axis.

With the caliper adaptor according to the twelfth aspect, it is possible to simplify the structure of the vehicle body while design flexibility of the axle coupling portion and the caliper mounting portion.

In accordance with a thirteenth aspect of the present invention, the caliper adaptor according to the twelfth aspect is configured so that the frame-coupling center axis is parallel to the axle-coupling center axis.

With the caliper adaptor according to the thirteenth aspect, it is possible to reliably simplify the structure of the vehicle body.

In accordance with a fourteenth aspect of the present invention, the caliper adaptor according to any one of the tenth to thirteenth aspects is configured so that the caliper mounting portion includes an additional caliper mounting hole. The additional caliper mounting hole has an additional caliper-mounting center axis spaced apart from the caliper-mounting center axis. The frame-coupling center axis is non-parallel to the additional caliper-mounting center axis.

With the caliper adaptor according to the fourteenth aspect, it is possible to improve coupling strength between the disc brake caliper and the caliper mounting portion.

In accordance with a fifteenth aspect of the present invention, the caliper adaptor according to the fourteenth aspect is configured so that the additional caliper-mounting center axis is parallel to the caliper-mounting center axis.

With the caliper adaptor according to the fifteenth aspect, it is possible to simplify the structure of the vehicle body and the caliper mounting portion.

In accordance with a fourteenth or fifteenth aspect of the present invention, the caliper adaptor according to the first aspect is configured so that the additional caliper-mounting center axis extends along a reference plane perpendicular to the rotational axis.

With the caliper adaptor according to the fourteenth aspect, it is possible to efficiently receive a force applied to the disc brake caliper using the caliper mounting portion.

In accordance with a seventeenth aspect of the present invention, the caliper adaptor according to any one of the first to sixteenth aspects further comprises a first frame. The first frame includes a first frame end and a first additional frame end. The first frame extends between the first frame end and the first additional frame end. The axle coupling portion is provided at the first frame end. The frame coupling portion is provided at the first additional frame end.

With the caliper adaptor according to the seventeenth aspect, it is possible to improve strength of the caliper adaptor with a comparatively simple structure.

In accordance with an eighteenth aspect of the present invention, the caliper adaptor according to the seventeenth aspect further comprises a second frame. The second frame is coupled to the first frame. The caliper mounting portion is provided to the second frame.

With the caliper adaptor according to the eighteenth aspect, it is possible to reliably improve strength of the caliper adaptor with a comparatively simple structure.

In accordance with a nineteenth aspect of the present invention, the caliper adaptor according to the eighteenth aspect is configured so that the second frame is integrally provided with the first frame as a one-piece unitary member.

With the caliper adaptor according to the nineteenth aspect, it is possible to more reliably improve strength of the caliper adaptor with a comparatively simple structure.

In accordance with a twentieth aspect of the present invention, the caliper adaptor according to any one of the first to nineteenth aspects is configured so that the caliper mounting portion includes a caliper mounting surface contactable with the disc brake caliper. The caliper mounting surface is non-perpendicular to the rotational axis.

With the caliper adaptor according to the twentieth aspect, it is possible to stably couple the disc brake caliper and the caliper mounting portion using the caliper mounting surface.

In accordance with a twenty-first aspect of the present invention, the caliper adaptor according to the twentieth aspect is configured so that the caliper mounting surface extends along the rotational axis.

With the caliper adaptor according to the twenty-first aspect, it is possible to more stably couple the disc brake caliper and the caliper mounting portion using the caliper mounting surface.

In accordance with a twenty-second aspect of the present invention, a disc brake caliper assembly for a human-powered vehicle comprises a disc brake caliper and the caliper adaptor according to any one of the first to twenty-first aspects. The disc brake caliper comprises a caliper body, a piston, and a brake pad. The caliper body includes a cylinder hole. The piston is movably provided in the cylinder hole. The brake pad is movable relative to the caliper body. The caliper adaptor is a separate member from the caliper body. The caliper body is mounted to the caliper mounting portion of the caliper adaptor.

With the disc brake caliper assembly according to the twenty-second aspect, it is possible to simplify the structure of the vehicle body by coupling the caliper adaptor and the hub axle of the hub assembly via the axle coupling portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
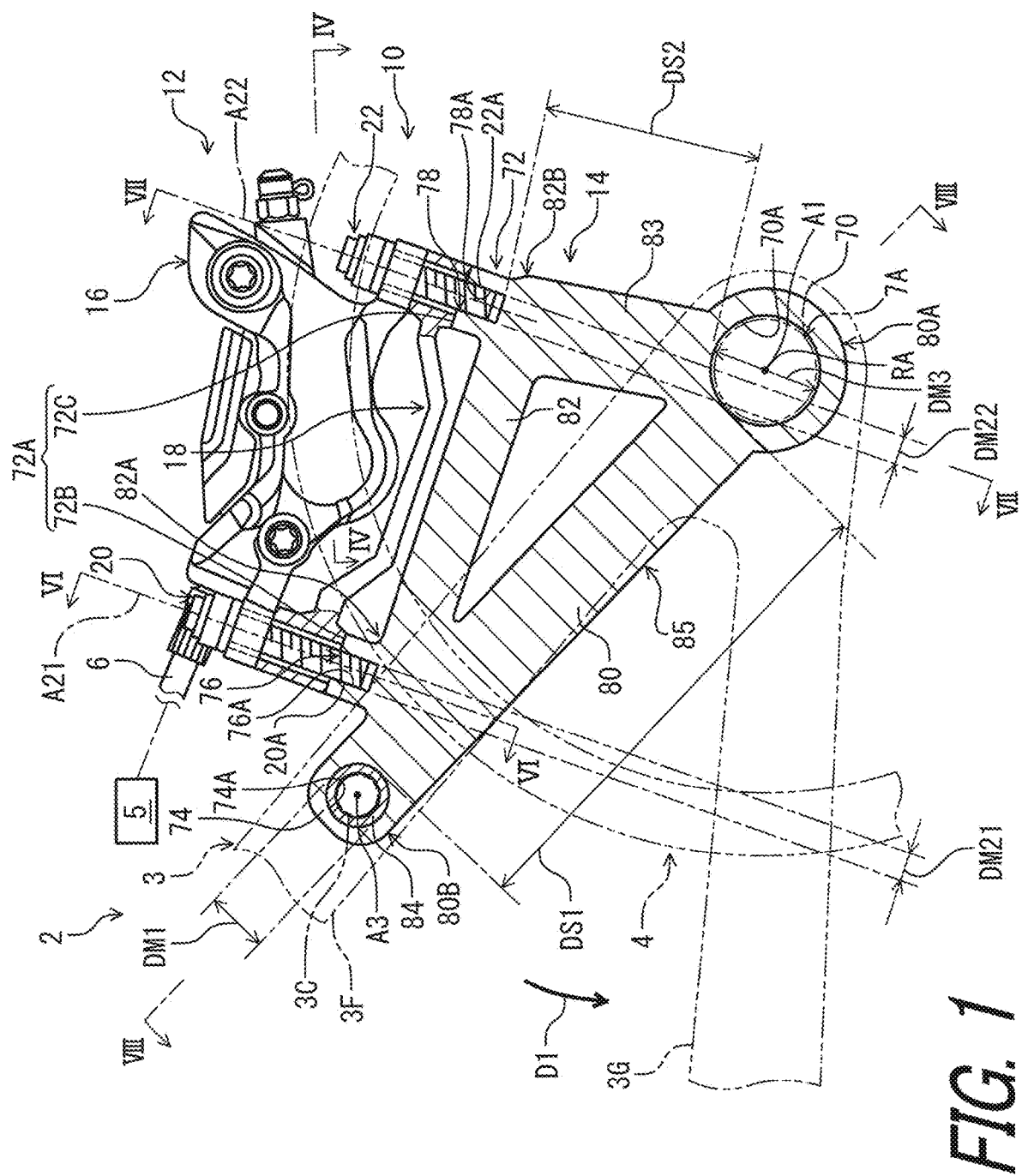
FIG. 1 is a partial plan view of a human-powered vehicle including a disc brake caliper assembly in accordance with one of embodiments, with a cross-section of a caliper adaptor of the disc brake caliper assembly.

The embodiments will now be described with reference to the accompanying drawings, wherein like reference numerals designate corresponding or identical elements throughout the various drawings.

As seen in FIG. 1, a human-powered vehicle 2 includes a disc brake caliper assembly 10 in accordance with one of embodiments. The disc brake caliper assembly 10 for the human-powered vehicle 2 comprises a disc brake caliper 12 and a caliper adaptor 14. The disc brake caliper 12 is mounted to a vehicle body 3 of the human-powered vehicle 2 via the caliper adaptor 14. The disc brake caliper 12 comprises a caliper body 16. The caliper adaptor 14 is a separate member from the caliper body 16. The disc brake caliper 12 is coupled to the caliper adaptor 14. The caliper adaptor 14 is coupled to the vehicle body 3.

The vehicle body 3 includes a first frame 3F and a second frame 3G. The first frame 3F can also be referred to as a seat stay. The second frame 3G can also be referred to as a chain stay. In the present embodiment, the caliper adaptor 14 is coupled to the first frame 3F. However, the caliper adaptor 14 can be coupled to the second frame 3G if needed and/or desired.

The disc brake caliper 12 includes an intermediate member 18. The intermediate member 18 is configured to be provided between the caliper body 16 and the caliper adaptor 14 in a mounting state where the disc brake caliper 12 is mounted to the vehicle body 3 via the caliper adaptor 14. The intermediate member 18 can be omitted from the disc brake caliper 12 if needed and/or desired. In such embodiments, the caliper body 16 is directly coupled to the caliper adaptor 14.

The disc brake caliper assembly 10 includes a caliper fastener 20 and an additional caliper fastener 22. The caliper fastener 20 is configured to fasten the disc brake caliper 12 to the caliper adaptor 14. The additional caliper fastener 22 is configured to fasten the disc brake caliper 12 to the caliper adaptor 14.

The human-powered vehicle 2 includes a disc brake rotor 4 and an operating device 5. The disc brake rotor 4 is rotatably coupled to the vehicle body 3 about a rotational axis RA. The disc brake rotor 4 rotates relative to the vehicle body 3 about the rotational axis RA in a driving rotational direction D1 during pedaling. The disc brake caliper 12 is connected to the operating device 5 via a hydraulic hose 6. The disc brake caliper 12 is configured to apply a braking force to the friction body 6A of the disc brake rotor 4 in response to the hydraulic pressure supplied from the operating device 5.

In the present application, the term "human-powered vehicle" includes a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the disc brake caliper assembly 10, the disc brake caliper 12, the caliper adaptor 14, or other components, should be interpreted relative to the human-powered vehicle 2 equipped with the disc brake caliper assembly 10, the disc brake caliper 12, the caliper adaptor 14, or other components as used in an upright riding position on a horizontal surface.

In the present embodiment, the disc brake caliper assembly 10 includes a rear disc brake caliper assembly. However, the structure of the disc brake caliper assembly 10 can be applied to a front disc brake caliper assembly if needed and/or desired.

Figure 2:
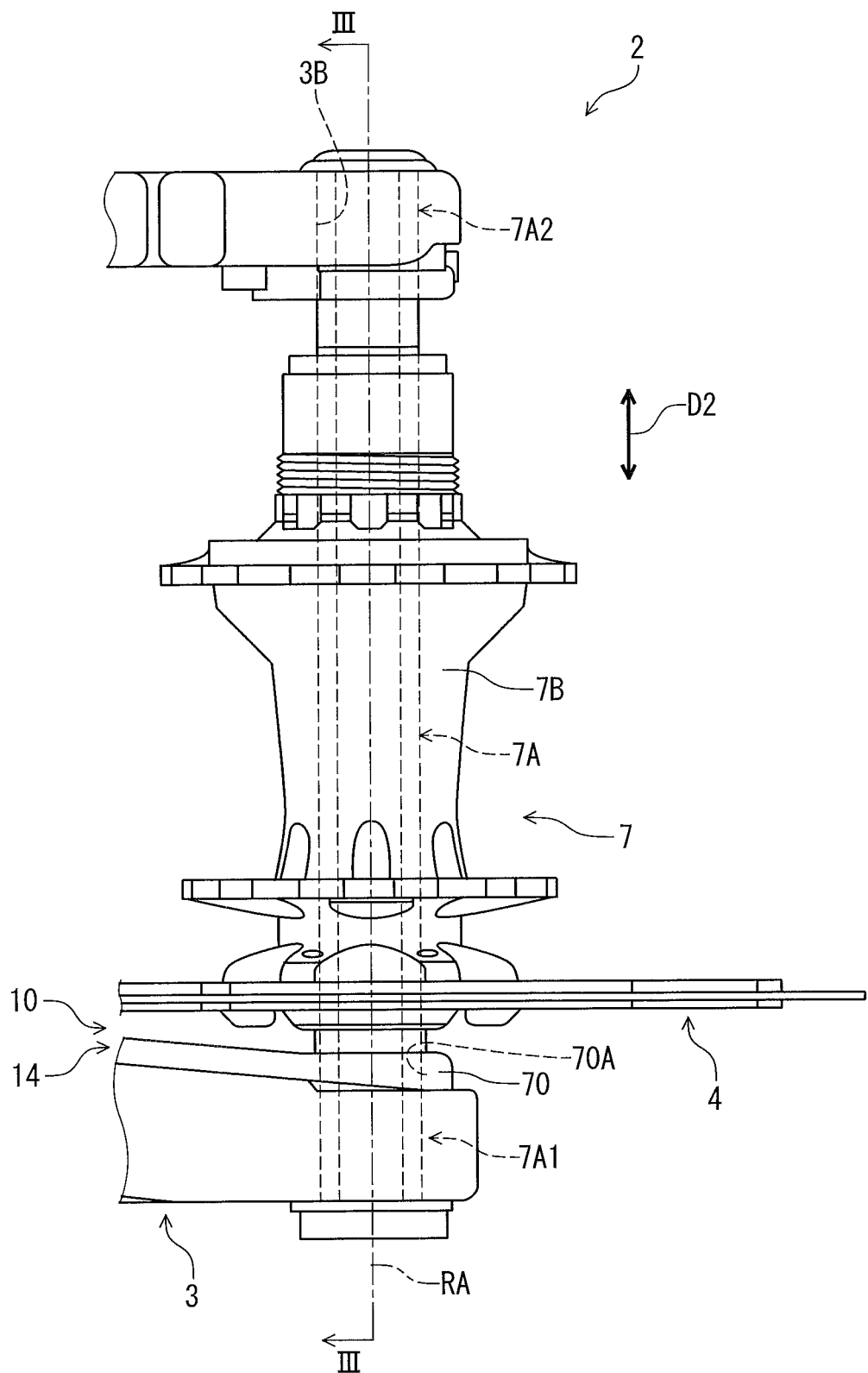
FIG. 2 is a partial plan view of a hub assembly of the human-powered vehicle illustrated in FIG. 1.

As seen in FIG. 2, the human-powered vehicle 2 includes a hub assembly 7. The hub assembly 7 is coupled to the vehicle body 3. The hub assembly 7 includes a hub axle 7A and a hub body 7B. The hub axle 7A is coupled to the vehicle body 3. The hub body 7B is rotatably supported by the hub axle 7A about the rotational axis RA. The disc brake rotor 4 is secured to the hub body 7B of the hub assembly 7.

Figure 3:
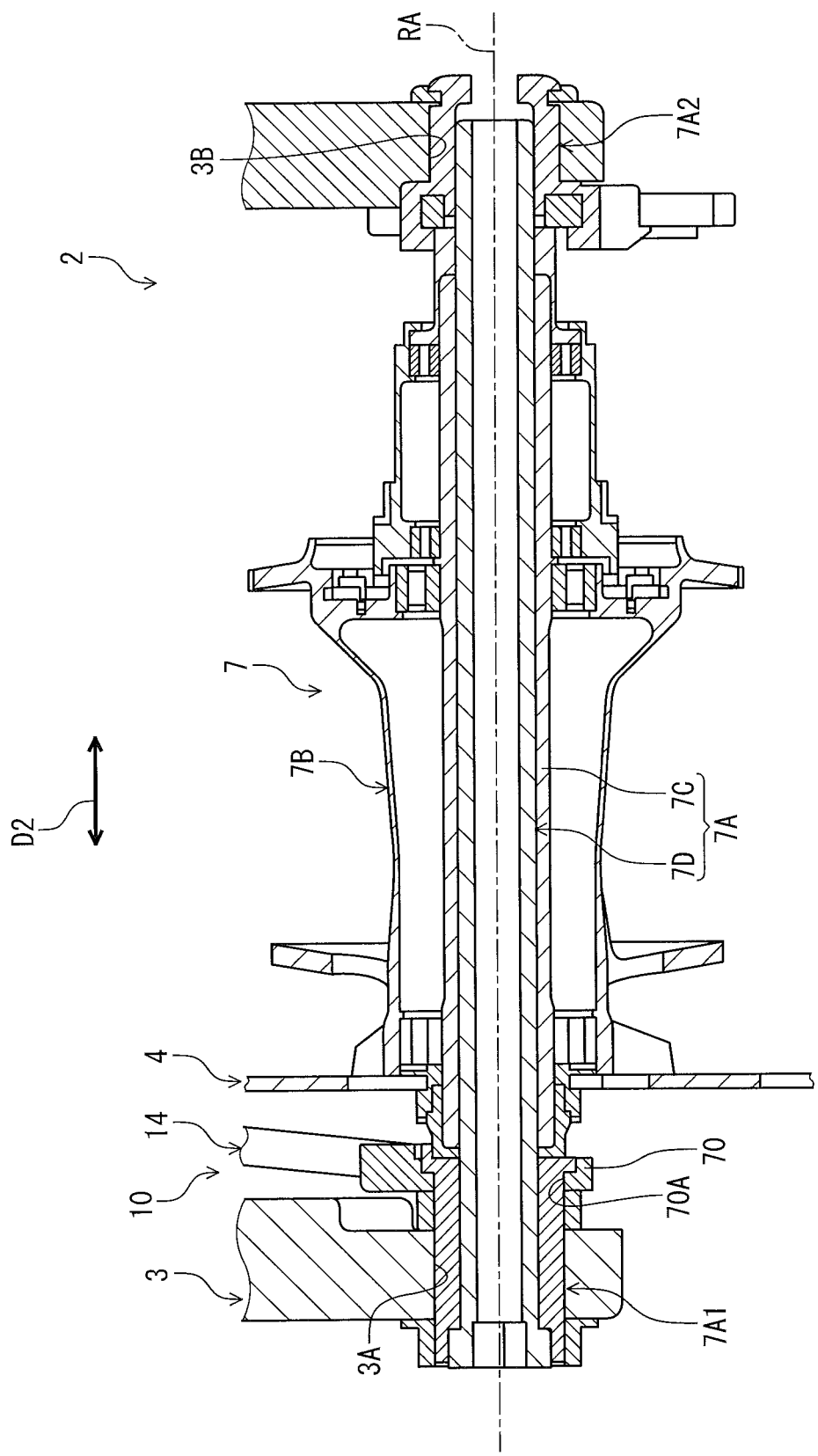
FIG. 3 is a cross-sectional view of the hub assembly taken along line III-III of FIG. 2.

As seen in FIG. 3, the hub axle 7A extends along the rotational axis RA of the hub assembly 7. The hub axle 7A includes a first axle end 7A1 and a second axle end 7A2. The hub axle 7A extends between the first axle end 7A1 and the second axle end 7A2 along the rotational axis RA. The vehicle body 3 includes a first securing hole 3A and a second securing hole 3B. The first securing hole 3A is spaced apart from the second securing hole 3B in an axial direction D2 parallel to the rotational axis RA. The first axle end 7A1 is provided in the first securing hole 3A. The second axle end 7A2 is provided in the second securing hole 3B.

The hub axle 7A includes a tubular member 7C and a securing rod 7D. The securing rod 7D extends through the tubular member 7C along the rotational axis RA. The securing rod 7D includes the first axle end 7A1 and the second axle end 7A2. The securing rod 7D extends through the first securing hole 3A and the second securing hole 3B.

Figure 4:
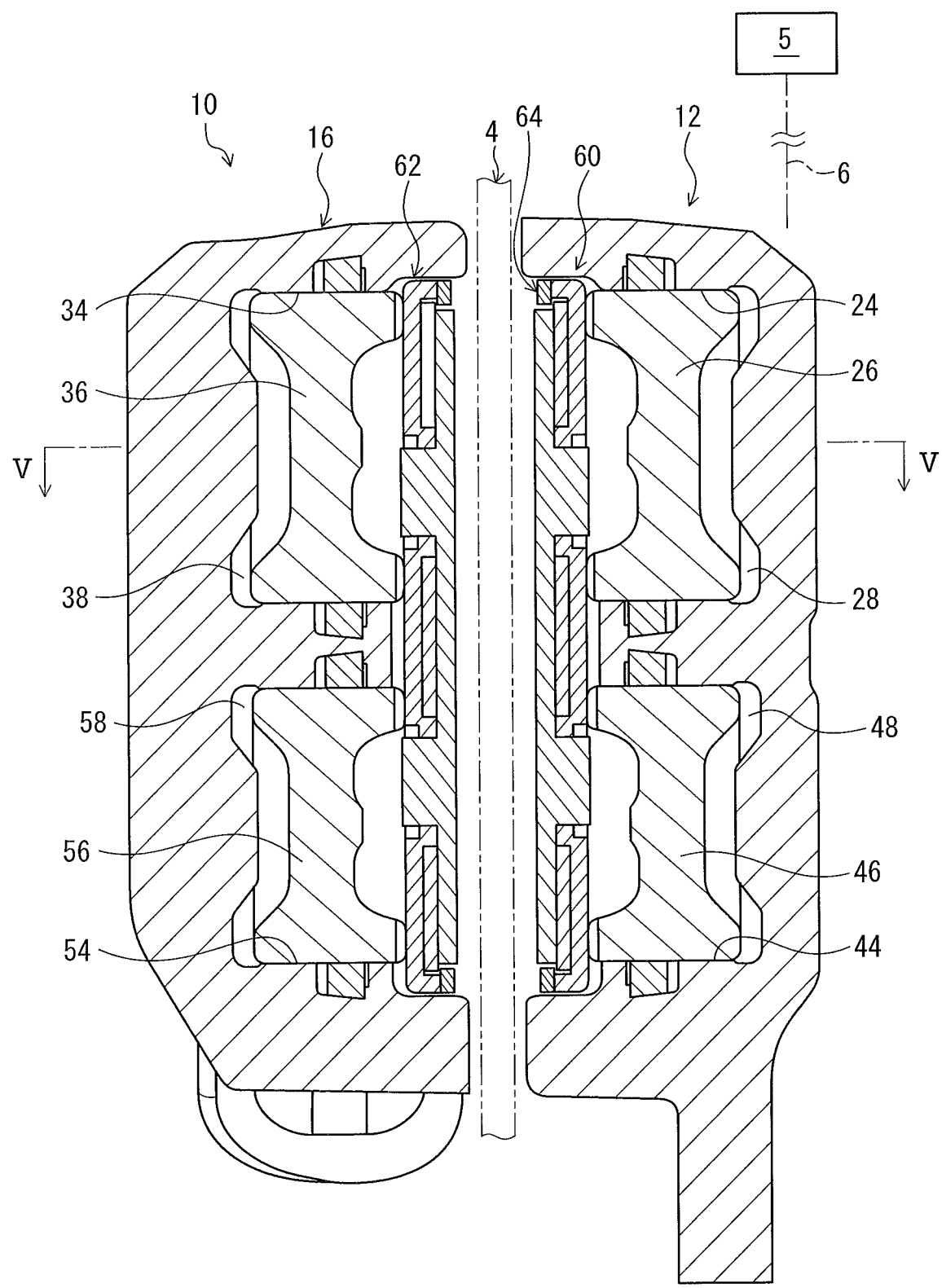
FIG. 4 is a cross-sectional view of the disc brake rotor assembly taken along line IV-IV of FIG. 1.

As seen in FIG. 4, the caliper body 16 includes a cylinder hole 24. The disc brake caliper 12 comprises a piston 26. The piston 26 is movably provided in the cylinder hole 24. The caliper body 16 and the piston 26 define a hydraulic chamber 28 in the cylinder hole 24. The hydraulic chamber 28 is in communication with a hydraulic chamber of the operating device 5 via the hydraulic hose 6.

The caliper body 16 includes a cylinder hole 34. The disc brake caliper 12 comprises a piston 36. The piston 36 is movably provided in the cylinder hole 34. The caliper body 16 and the piston 36 define a hydraulic chamber 38 in the cylinder hole 34. The hydraulic chamber 38 is in communication with the hydraulic chamber of the operating device 5 via the hydraulic hose 6.

The caliper body 16 includes a cylinder hole 44. The disc brake caliper 12 comprises a piston 46. The piston 46 is movably provided in the cylinder hole 44. The caliper body 16 and the piston 46 define a hydraulic chamber 48 in the cylinder hole 44. The hydraulic chamber 48 is in communication with the hydraulic chamber of the operating device 5 via the hydraulic hose 6.

The caliper body 16 includes a cylinder hole 54. The disc brake caliper 12 comprises a piston 56. The piston 56 is movably provided in the cylinder hole 54. The caliper body 16 and the piston 56 define a hydraulic chamber 58 in the cylinder hole 54. The hydraulic chamber 58 is in communication with the hydraulic chamber of the operating device 5 via the hydraulic hose 6.

The disc brake caliper 12 comprises a brake pad 60. The brake pad 60 is movable relative to the caliper body 16. The piston 26 is configured to move the brake pad 60 toward the disc brake rotor 4 in response to the hydraulic pressure supplied to the hydraulic chamber 28. The piston 46 is configured to move the brake pad 60 toward the disc brake rotor 4 in response to the hydraulic pressure supplied to the hydraulic chamber 48.

The disc brake caliper 12 comprises a brake pad 62. The brake pad 62 is movable relative to the caliper body 16. The piston 36 is configured to move the brake pad 62 toward the disc brake rotor 4 in response to the hydraulic pressure supplied to the hydraulic chamber 38. The piston 56 is configured to move the brake pad 62 toward the disc brake rotor 4 in response to the hydraulic pressure supplied to the hydraulic chamber 58.

In the present embodiment, the caliper body 16 includes the cylinder holes 24, 34, 44, and 54. The disc brake caliper 12 includes the pistons 26, 36, 46, and 56. However, the total number of cylinder holes is not limited to the illustrated embodiment. The total number of pistons is not limited to the illustrated embodiment. At least one of the cylinder holes 24, 34, 44, and 54 can be omitted from the caliper body 16 if needed and/or desired. At least one of the pistons 26, 36, 46, and 56 can be omitted from the disc brake caliper 12 if needed and/or desired.

Figure 5:
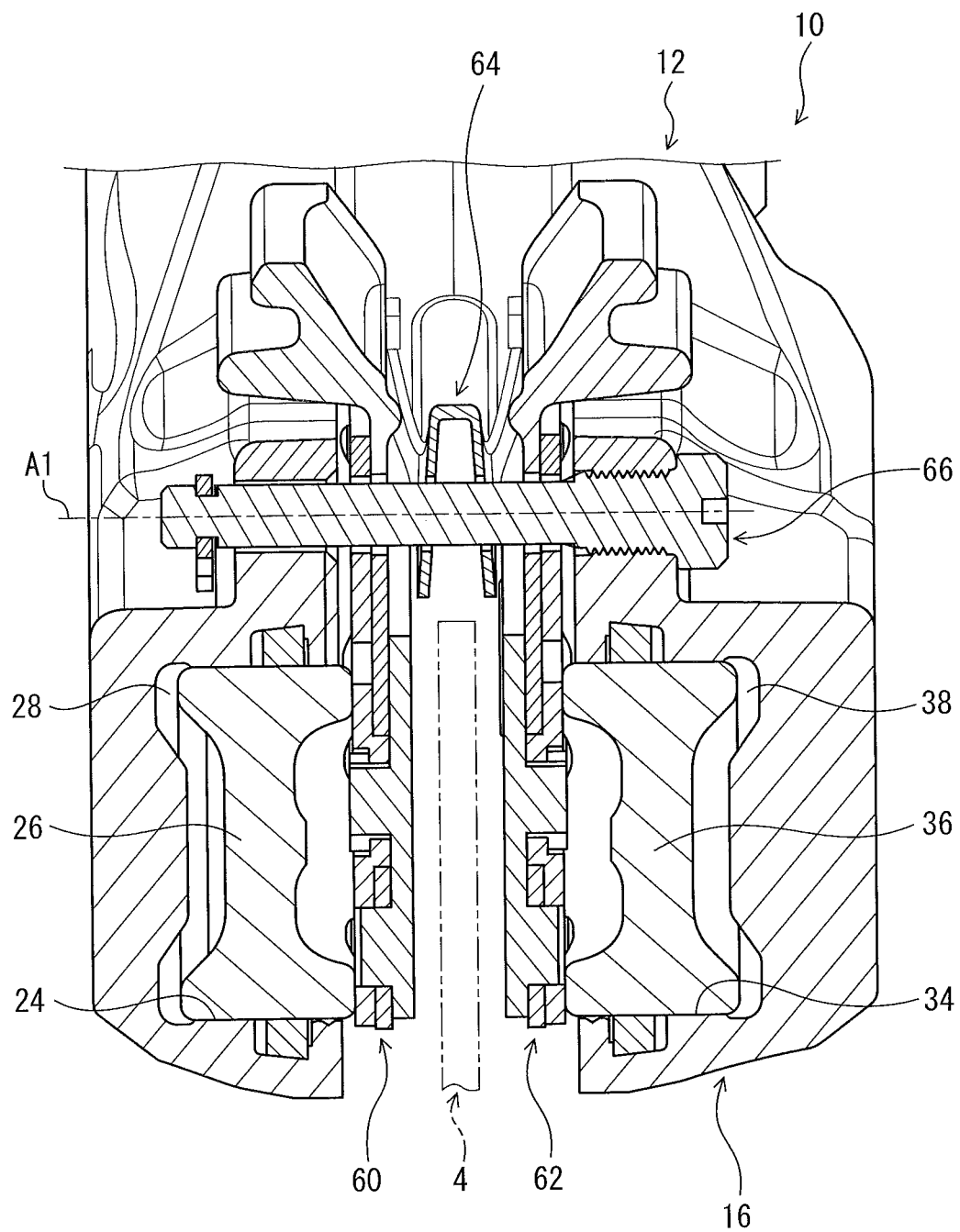
FIG. 5 is a cross-sectional view of the disc brake rotor assembly taken along line V-V of FIG. 4.

As seen in FIG. 5, the disc brake caliper 12 includes a biasing member 64 and a pad support axle 66. The biasing member 64 is coupled to the caliper body 16 to bias the brake pads 60 and 62 away from the disc brake rotor 4. The pad support axle 66 is coupled to the caliper body 16 to movably support the brake pads 60 and 62. The pad support axle 66 movably supports the biasing member 64.

As seen in FIG. 1, the caliper adaptor 14 for the disc brake caliper 12 of the human-powered vehicle 2 comprises an axle coupling portion 70, a caliper mounting portion 72, and a frame coupling portion 74. The caliper adaptor 14 includes an adaptor body 75. The adaptor body 75 includes the axle coupling portion 70, the caliper mounting portion 72, and the frame coupling portion 74.

The axle coupling portion 70 is configured to be coupled to the hub axle 7A of the hub assembly 7 of the human-powered vehicle 2. The caliper mounting portion 72 is configured to mount the disc brake caliper 12. The caliper mounting portion 72 is configured to mount the disc brake caliper 12 to the vehicle body 3. The caliper body 16 is mounted to the caliper mounting portion 72 of the caliper adaptor 14. The frame coupling portion 74 is configured to be coupled to the vehicle body 3 of the human-powered vehicle 2.

As seen in FIG. 3, the axle coupling portion 70 includes an axle coupling hole 70A in which the hub axle 7A is to be at least partially provided. In the present embodiment, the hub axle 7A is partially provided in the axle coupling hole 70A. The first axle end 7A1 of the hub axle 7A is partially provided in the axle coupling hole 70A. However, the hub axle 7A can be entirely provided in the axle coupling hole 70A if needed and/or desired. The first axle end 7A1 of the hub axle 7A can be entirely provided in the axle coupling hole 70A.

The axle coupling hole 70A has an axle-coupling center axis A1. The axle coupling hole 70A extends along the axle-coupling center axis A1. In the present embodiment, the axle-coupling center axis A1 extends along the rotational axis RA in a state where the axle coupling portion 70 is coupled to the hub axle 7A of the hub assembly 7. The axle-coupling center axis A1 is parallel to the rotational axis RA in the state where the axle coupling portion 70 is coupled to the hub axle 7A of the hub assembly 7. However, the axle-coupling center axis A1 can be non-parallel to the rotational axis RA in the state where the axle coupling portion 70 is coupled to the hub axle 7A of the hub assembly 7 if needed and/or desired.

As seen in FIG. 1, the caliper mounting portion 72 includes a caliper mounting hole 76. The caliper mounting hole 76 has a caliper-mounting center axis A21. The caliper mounting hole 76 extends along the caliper-mounting center axis A21. The caliper fastener 20 is configured to fasten the disc brake caliper 12 to the caliper adaptor 14. The caliper fastener 20 is provided in the caliper mounting hole 76 in a state where the disc brake caliper 12 is fastened to the caliper adaptor 14.

Figure 6:
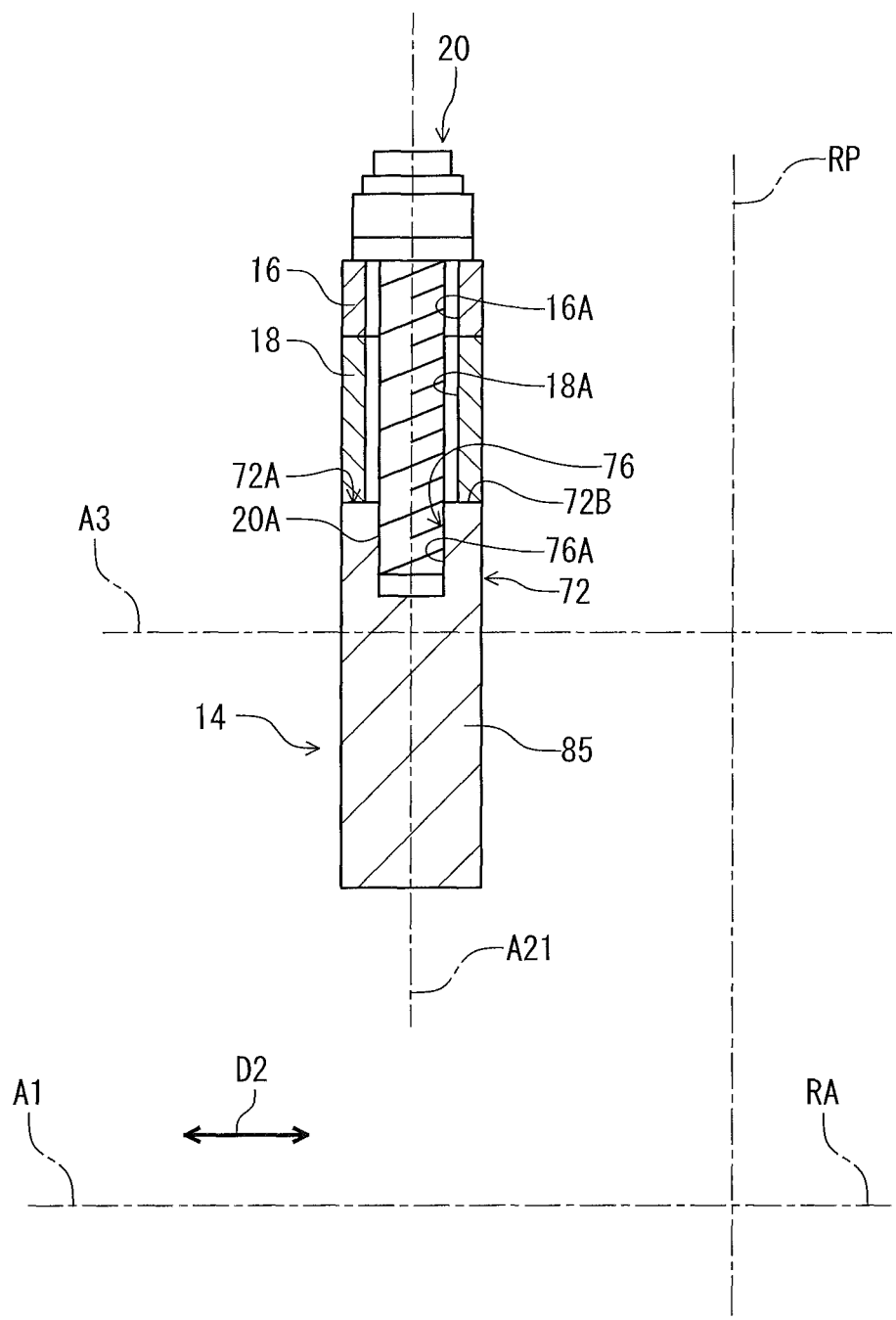
FIG. 6 is a cross-sectional view of the disc brake rotor assembly taken along line VI-VI of FIG. 1.

As seen in FIG. 6, the caliper mounting hole 76 includes an internal threaded portion 76A. The internal threaded portion 76A is configured to engage with the caliper fastener 20 configured to fasten the disc brake caliper 12 to the caliper adaptor 14. The caliper fastener 20 includes an external threaded portion 20A. The internal threaded portion 76A of the caliper mounting hole 76 is configured to engage with the external threaded portion 20A of the caliper fastener 20.

The caliper-mounting center axis A21 extends along a reference plane RP perpendicular to the rotational axis RA. The axle-coupling center axis A1 is non-parallel to the caliper-mounting center axis A21. The frame-coupling center axis A3 is non-parallel to the caliper-mounting center axis A21.

In the present embodiment, the caliper-mounting center axis A21 is parallel to the reference plane RP in the mounting state where the disc brake caliper 12 is mounted to the vehicle body 3 via the caliper adaptor 14. However, the caliper-mounting center axis A21 can be non-parallel to the reference plane RP in the mounting state if needed and/or desired. The axle-coupling center axis A1 can be parallel to the caliper-mounting center axis A21 if needed and/or desired. The frame-coupling center axis A3 can be parallel to the caliper-mounting center axis A21 if needed and/or desired.

The caliper body 16 includes a first caliper hole 16A. The intermediate member 18 includes a first intermediate hole 18A. The caliper fastener 20 extends through the first caliper hole 16A and the first intermediate hole 18A.

As seen in FIG. 1, the caliper mounting portion 72 includes an additional caliper mounting hole 78. The additional caliper mounting hole 78 has an additional caliper-mounting center axis A22 spaced apart from the caliper-mounting center axis A21. The additional caliper-mounting center axis A22 extends along the caliper-mounting center axis A21. The additional caliper-mounting center axis A22 is parallel to the caliper-mounting center axis A21. However, the additional caliper-mounting center axis A22 can be non-parallel to the caliper-mounting center axis A21 if needed and/or desired.

The additional caliper fastener 22 is configured to fasten the disc brake caliper 12 to the caliper adaptor 14. The additional caliper fastener 22 is provided in the additional caliper mounting hole 78 in the state where the disc brake caliper 12 is fastened to the caliper adaptor 14.

Figure 7:
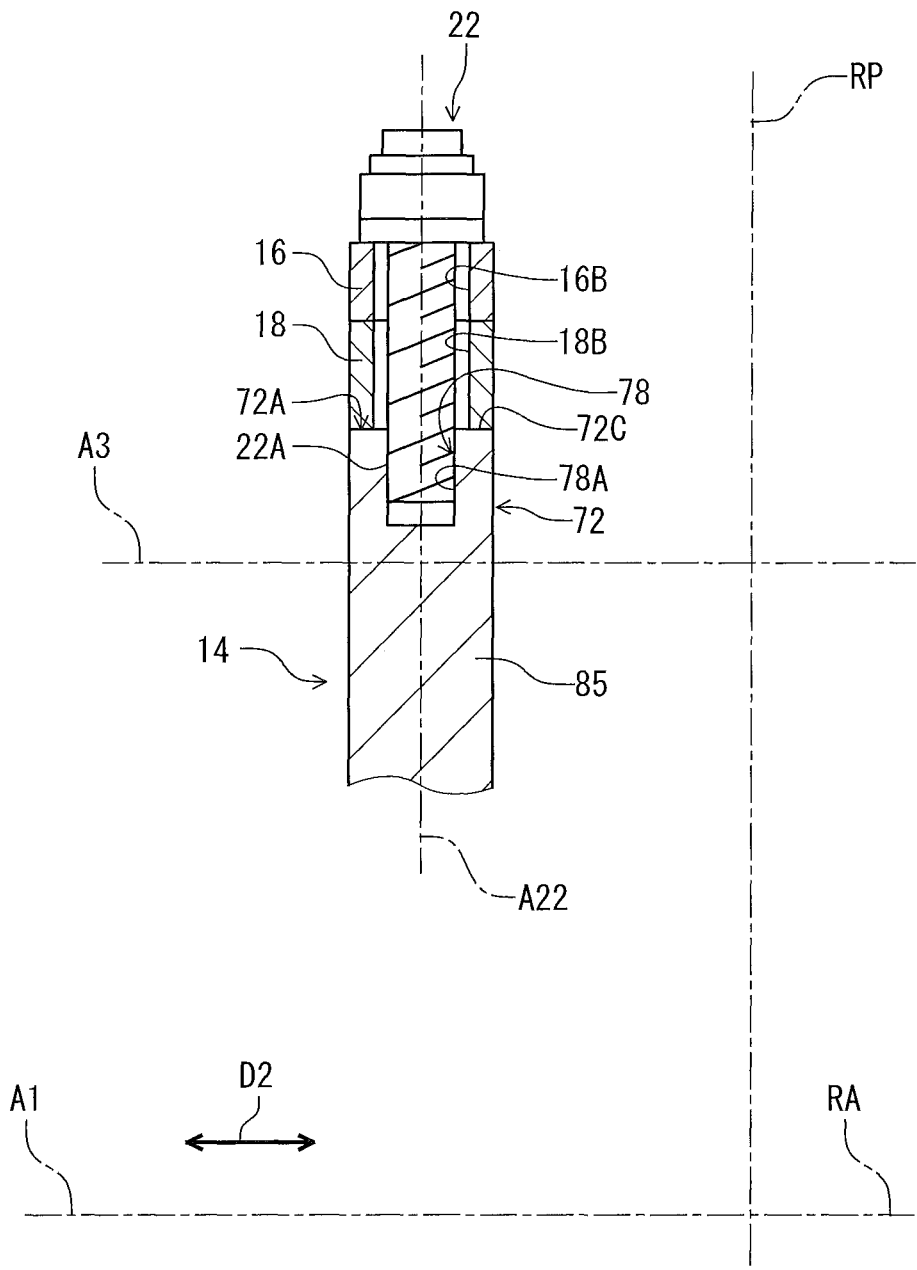
FIG. 7 is a cross-sectional view of the disc brake rotor assembly taken along line VII-VII of FIG. 1.

As seen in FIG. 7, the additional caliper mounting hole 78 includes an internal threaded portion 78A. The internal threaded portion 78A is configured to engage with the additional caliper fastener 22 configured to fasten the disc brake caliper 12 to the caliper adaptor 14. The additional caliper fastener 22 includes an external threaded portion 22A. The internal threaded portion 78A of the additional caliper mounting hole 78 is configured to engage with the external threaded portion 22A of the additional caliper fastener 22.

The additional caliper-mounting center axis A22 extends along the reference plane RP perpendicular to the rotational axis RA. The axle-coupling center axis A1 is non-parallel to the additional caliper-mounting center axis A22. The frame-coupling center axis A3 is non-parallel to the additional caliper-mounting center axis A22.

In the present embodiment, the additional caliper-mounting center axis A22 is parallel to the reference plane RP in the mounting state where the disc brake caliper 12 is mounted to the vehicle body via the caliper adaptor 14. However, the additional caliper-mounting center axis A22 can be non-parallel to the reference plane RP in the mounting state if needed and/or desired. The axle-coupling center axis A1 can be parallel to the additional caliper-mounting center axis A22 if needed and/or desired. The frame-coupling center axis A3 can be parallel to the additional caliper-mounting center axis A22 if needed and/or desired.

The caliper body 16 includes a second caliper hole 16B. The intermediate member 18 includes a second intermediate hole 18B. The caliper fastener 20 extends through the second caliper hole 16B and the second intermediate hole 18B.

The positional relationship between the caliper mounting hole 76 and the additional caliper mounting hole 78 is not limited to the positional relationship illustrated in FIG. 1. For example, the additional caliper mounting hole 78 can be provided in a position in which the caliper mounting hole 76 is provided in FIG. 1 if needed and/or desired. The caliper mounting hole 76 can be provided in a position in which the additional caliper mounting hole 78 is provided in FIG. 1 if needed and/or desired.

As seen in FIG. 1, the caliper adaptor 14 further comprises a first frame 80. The axle coupling portion 70 is provided to the first frame 80. The frame coupling portion 74 is provided to the first frame 80.

The first frame 80 includes a first frame end 80A and a first additional frame end 80B. The first frame 80 extends between the first frame end 80A and the first additional frame end 80B. The axle coupling portion 70 is provided at the first frame end 80A. The frame coupling portion 74 is provided at the first additional frame end 80B.

The caliper adaptor 14 further comprises a second frame 82. The second frame 82 is coupled to the first frame 80. The caliper mounting portion 72 is provided to the second frame 82.

The second frame 82 includes a second frame end 82A and a second additional frame end 82B. The second frame 82 extends between the second frame end 82A and the second additional frame end 82B. The second frame end 82A is coupled to the first frame 80. The caliper mounting hole 76 is provided at the second frame end 82A. The additional caliper mounting hole 78 is provided at the second additional frame end 82B.

The caliper adaptor 14 further comprises a third frame 83. The third frame 83 is coupled to the first frame 80 and the second frame 82. The third frame 83 extends between the first frame 80 and the second frame 82. The third frame 83 is coupled to the first frame end 80A of the first frame 80. The third frame 83 is coupled to the second additional frame end 82B of the second frame 82.

In the present embodiment, the adaptor body 75 includes the first frame 80, the second frame 82, and the third frame 83. The second frame 82 is integrally provided with the first frame 80 as a one-piece unitary member. The third frame 83 is integrally provided with the first frame 80 and the second frame 82 as a one-piece unitary member. The adaptor body 75 is integrally provided as a one-piece unitary member. The axle coupling portion 70 is integrally provided with the caliper mounting portion 72 and the frame coupling portion 74 as a one-piece unitary member. The caliper mounting portion 72 is integrally provided with the axle coupling portion 70 and the frame coupling portion 74 as a one-piece unitary member. The frame coupling portion 74 is integrally provided with the axle coupling portion 70 and the caliper mounting portion 72 as a one-piece unitary member.

However, the second frame 82 can be a separate member from the first frame 80 if needed and/or desired. The third frame 83 can be a separate member from at least one of the first frame 80 and the second frame 82 if needed and/or desired. The adaptor body 75 can include at least two separate members if needed and/or desired. The axle coupling portion 70 can be a separate member from at least one of the caliper mounting portion 72 and the frame coupling portion 74 if needed and/or desired. The caliper mounting portion 72 can be a separate member from at least one of the axle coupling portion 70 and the frame coupling portion 74 if needed and/or desired. The frame coupling portion 74 can be a separate member from the axle coupling portion 70 and the caliper mounting portion 72 if needed and/or desired.

Figure 8:
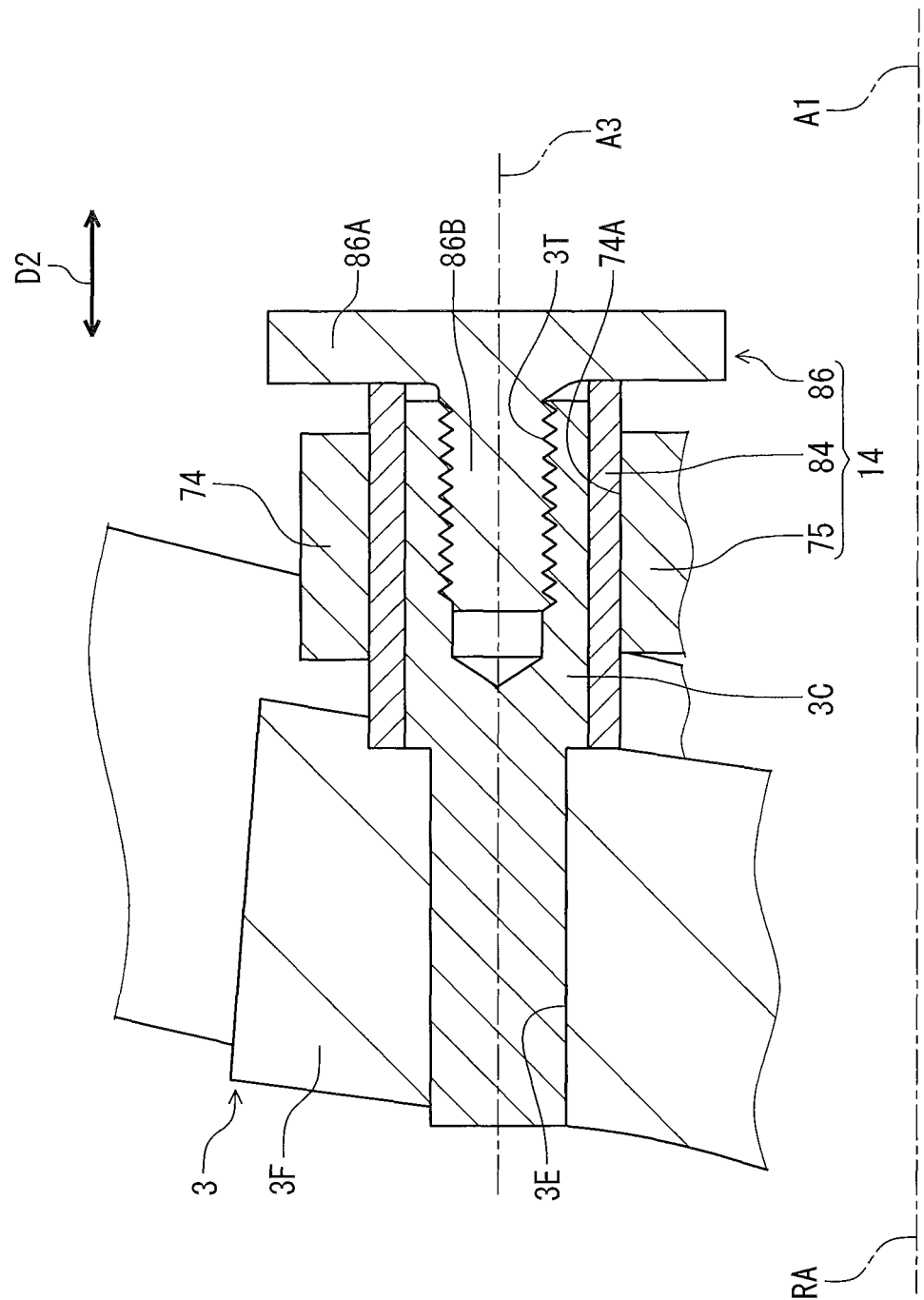
FIG. 8 is a cross-sectional view of the disc brake rotor assembly taken along line VIII-VIII of FIG. 1.

As seen in FIG. 8, the frame coupling portion 74 includes a frame coupling hole 74A in which a protrusion 3C of the vehicle body 3 is to be at least partially provided. In the present embodiment, the protrusion 3C of the vehicle body 3 is partially provided in the frame coupling hole 74A in the mounting state. However, the protrusion 3C of the vehicle body 3 can be entirely provided in the frame coupling hole 74A if needed and/or desired.

The frame coupling hole 74A has a frame-coupling center axis A3. The frame coupling hole 74A extends along the frame-coupling center axis A3. In the present embodiment, the frame coupling hole 74A extends in the axial direction D2 in a coupling state where the protrusion 3C is partially provided in the frame coupling hole 74A. The frame-coupling center axis A3 extends in the axial direction D2 in the coupling state. The frame-coupling center axis A3 is parallel to the axial direction D2 in the coupling state. However, the frame-coupling center axis A3 can be non-parallel to the axial direction D2 in the coupling state if needed and/or desired.

The first frame 3F includes a hole 3E. The protrusion 3C is partially provided in the hole 3E. The protrusion 3C is secured to the first frame 3F with a securing structure such as an adhesive, press-fitting, and insert molding. The protrusion 3C protrudes from the first frame 3F in the axial direction D2. In the present embodiment, the protrusion 3C is a separate member from the first frame 3F. However, the protrusion 3C can be integrally provided with the first frame 3F as a one-piece unitary member. In the present embodiment, the first frame 80 extends along the first frame 3F in a state where the axle coupling portion 70 is coupled to the hub axle 7A of the hub assembly 7 and the frame coupling portion 74 is coupled to the protrusion 3C.

As seen in FIG. 8, the caliper adaptor 14 further comprises a sleeve 84. The sleeve 84 is provided in the frame coupling hole 74A. The sleeve 84 includes a sleeve hole 84A in which the protrusion 3C is to be at least partially provided. The sleeve 84 is provided between the frame coupling portion 74 and the protrusion 3C in the coupling state.

In the present embodiment, the sleeve 84 is a separate member from the adaptor body 75. The sleeve 84 is a separate member from the frame coupling portion 74. The sleeve 84 is made of a non-metallic material. The sleeve 84 is made of a resin material. Examples of the resin material include rubber and plastic. The adaptor body 75 is made of a material different from the material of the sleeve 84. The adaptor body 75 is made of a metallic material. The sleeve 84 is elastically deformable between the frame coupling portion 74 and the protrusion 3C of the protrusion 3C. However, the material of the sleeve 84 is not limited to the non-metallic material. The material of the sleeve 84 is not limited to the resin material. The sleeve 84 can be omitted from the caliper adaptor 14 if needed and/or desired. The material of the adaptor body 75 is not limited to the metallic material.

The caliper adaptor 14 includes a mounting fastener 86. The mounting fastener 86 is configured to fasten the frame coupling portion 74 to the protrusion 3C of the protrusion 3C. The protrusion 3C includes a threaded hole 3T. The mounting fastener 86 includes a head part 86A and a rod part 86B. The head part 86A is provided at an end of the rod part 86B. The rod part 86B includes an externally threaded part engaged with the threaded hole 3T of the protrusion 3C. The sleeve 84 is held between the first frame 3F and the head part 86A of the mounting fastener 86.

As seen in FIG. 8, the frame-coupling center axis A3 extends along the axle-coupling center axis A1. The frame-coupling center axis A3 extends along the rotational axis RA in the mounting state where the disc brake caliper 12 is mounted to the vehicle body 3 via the caliper adaptor 14. In the present embodiment, the frame-coupling center axis A3 is parallel to the axle-coupling center axis A1. The frame-coupling center axis A3 is parallel to the rotational axis RA in the mounting state. However, the frame-coupling center axis A3 can be non-parallel to the axle-coupling center axis A1 if needed and/or desired. The frame-coupling center axis A3 can be non-parallel to the rotational axis RA in the mounting state if needed and/or desired.

As seen in FIG. 1, the frame coupling portion 74 is at least partially provided radially outwardly of the caliper mounting portion 72 relative to the rotational axis RA. With the frame coupling portion 74 being at least partially provided radially outwardly of the caliper mounting portion 72 relative to the rotational axis RA, it is possible to reduce a load to be applied to the frame coupling portion 74 in a braking state where the disc brake caliper 12 applies the braking force to the friction body 6A of the disc brake rotor 4. The frame coupling portion 74 is at least partially provided radially outwardly of the axle coupling portion 70 relative to the rotational axis RA. The caliper mounting portion 72 is at least partially provided radially outwardly of the axle coupling portion 70 relative to the rotational axis RA.

In the present embodiment, the frame coupling portion 74 is entirely provided radially outwardly of the caliper mounting portion 72 relative to the rotational axis RA. The frame coupling portion 74 is entirely provided radially outwardly of the axle coupling portion 70 relative to the rotational axis RA. The caliper mounting portion 72 is entirely provided radially outwardly of the axle coupling portion 70 relative to the rotational axis RA.

However, the frame coupling portion 74 can be partially provided radially outwardly of the caliper mounting portion 72 relative to the rotational axis RA if needed and/or desired. The frame coupling portion 74 can be partially provided radially outwardly of the axle coupling portion 70 relative to the rotational axis RA if needed and/or desired. The caliper mounting portion 72 can be partially provided radially outwardly of the axle coupling portion 70 relative to the rotational axis RA if needed and/or desired.

As seen in FIG. 1, the frame coupling hole 74A is at least partially provided radially outwardly of the caliper mounting portion 72 relative to the rotational axis RA. The frame coupling hole 74A is at least partially provided radially outwardly of the caliper mounting hole 76 relative to the rotational axis RA. The frame coupling hole 74A is at least partially provided radially outwardly of the additional caliper mounting hole 78 relative to the rotational axis RA.

In the present embodiment, the frame coupling hole 74A is entirely provided radially outwardly of the caliper mounting portion 72 relative to the rotational axis RA. The frame coupling hole 74A is entirely provided radially outwardly of the caliper mounting hole 76 relative to the rotational axis RA. The frame coupling hole 74A is entirely provided radially outwardly of the additional caliper mounting hole 78 relative to the rotational axis RA.

However, the frame coupling hole 74A can be partially provided radially outwardly of the caliper mounting portion 72 relative to the rotational axis RA if needed and/or desired. The frame coupling hole 74A can be partially provided radially outwardly of the caliper mounting hole 76 relative to the rotational axis RA if needed and/or desired. The frame coupling hole 74A can be partially provided radially outwardly of the additional caliper mounting hole 78 relative to the rotational axis RA if needed and/or desired.

As seen in FIG. 1, the frame coupling hole 74A is at least partially provided radially outwardly of the axle coupling hole 70A relative to the rotational axis RA. In the present embodiment, the frame coupling hole 74A is entirely provided radially outwardly of the axle coupling hole 70A relative to the rotational axis RA. However, the frame coupling hole 74A can be partially provided radially outwardly of the axle coupling hole 70A relative to the rotational axis RA if needed and/or desired.

As seen in FIG. 1, the caliper mounting portion 72 is at least partially provided radially outwardly of the axle coupling hole 70A relative to the rotational axis RA. The caliper mounting hole 76 is at least partially provided radially outwardly of the axle coupling hole 70A relative to the rotational axis RA. The additional caliper mounting hole 78 is at least partially provided radially outwardly of the axle coupling hole 70A relative to the rotational axis RA.

In the present embodiment, the caliper mounting portion 72 is entirely provided radially outwardly of the axle coupling hole 70A relative to the rotational axis RA. The caliper mounting hole 76 is entirely provided radially outwardly of the axle coupling hole 70A relative to the rotational axis RA. The additional caliper mounting hole 78 is entirely provided radially outwardly of the axle coupling hole 70A relative to the rotational axis RA.

However, the caliper mounting portion 72 can be partially provided radially outwardly of the axle coupling hole 70A relative to the rotational axis RA if needed and/or desired. The caliper mounting hole 76 can be partially provided radially outwardly of the axle coupling hole 70A relative to the rotational axis RA if needed and/or desired. The additional caliper mounting hole 78 can be partially provided radially outwardly of the axle coupling hole 70A relative to the rotational axis RA if needed and/or desired.

As seen in FIG. 1, a first distance DS1 is defined between the axle coupling portion 70 and the frame coupling portion 74. A second distance DS2 is defined between the axle coupling portion 70 and the caliper mounting portion 72. The first distance DS1 is defined between the axle coupling hole 70A and the frame coupling hole 74A. The second distance DS2 is defined between the axle coupling hole 70A and the additional caliper mounting hole 78. The first distance DS1 is different from the second distance DS2. In the present embodiment, the first distance DS1 is longer than the second distance DS2. However, the first distance DS1 can be equal to or shorter than the second distance DS2 if needed and/or desired.

As seen in FIG. 1, the frame coupling hole 74A has a first diameter DM1. The caliper mounting hole 76 has a second diameter DM21. The additional caliper mounting hole 78 has a second additional diameter DM22. The axle coupling hole 70A has a third diameter DM3.

In the present embodiment, the first diameter DM1 is different from at least one of the second diameter DM21, the second additional diameter DM22, and the third diameter DM3. The second diameter DM21 is different from at least one of the first diameter DM1, the second additional diameter DM22, and the third diameter DM3. The second additional diameter DM22 is different from at least one of the first diameter DM1, the second diameter DM21, and the third diameter DM3. The third diameter DM3 is different from at least one of the second diameter DM21, the second additional diameter DM22, and the first diameter DM1.

In the present embodiment, the first diameter DM1 is different from the second diameter DM21, the second additional diameter DM22, and the third diameter DM3. The third diameter DM3 is different from the second diameter DM21, the second additional diameter DM22, and the first diameter DM1. The second diameter DM21 is equal to the second additional diameter DM22.

The first diameter DM1 is larger than the second diameter DM21. The first diameter DM1 is larger than the second additional diameter DM22. The first diameter DM1 is smaller than the third diameter DM3. The third diameter DM3 is larger than the first diameter DM1, the second diameter DM21, and the second additional diameter DM22.

However, the first diameter DM1 can be equal to or smaller than at least one of the second diameter DM21 and the second additional diameter DM22 if needed and/or desired. The third diameter DM3 can be equal to or smaller than at least one of the first diameter DM1, the second diameter DM21, and the second additional diameter DM22 if needed and/or desired. The second diameter DM21 can be different from the second additional diameter DM22 if needed and/or desired.

For example, the first diameter DM1 ranges from 7 mm to 20 mm. The second diameter DM21 ranges from 3 mm to 7 mm. In the present embodiment, the first diameter DM1 is equal to 10 mm. The second diameter DM2 is equal to 6 or 5.2 mm. However, the first diameter DM1 is not limited to the above range and diameter. The second diameter DM2 is not limited to the above range and diameter.

As seen in FIG. 1, the caliper mounting portion 72 includes a caliper mounting surface 72A contactable with the disc brake caliper 12. The caliper mounting surface 72A is contactable with the intermediate member 18 of the disc brake caliper 12. The caliper mounting surface 72A include a first caliper mounting surface 72B and a second caliper mounting surface 72C spaced apart from the first caliper mounting surface 72B. The first caliper mounting surface 72B contactable with the disc brake caliper 12. The first caliper mounting surface 72B is contactable with the intermediate member 18 of the disc brake caliper 12. The second caliper mounting surface 72C contactable with the disc brake caliper 12. The second caliper mounting surface 72C is contactable with the intermediate member 18 of the disc brake caliper 12.

As seen in FIGS. 6 and 7, the caliper mounting surface 72A is non-perpendicular to the rotational axis RA. The caliper mounting surface 72A extends along the rotational axis RA. The caliper mounting surface 72A is non-perpendicular to the axle-coupling center axis A1. The caliper mounting surface 72A extends along the axle-coupling center axis A1. The caliper mounting surface 72A is non-perpendicular to the frame-coupling center axis A3. The caliper mounting surface 72A extends along the frame-coupling center axis A3.

In the present embodiment, the caliper mounting surface 72A is parallel to the rotational axis RA in the mounting state. The caliper mounting surface 72A is parallel to the axle-coupling center axis A1. The caliper mounting surface 72A is parallel to the frame-coupling center axis A3. The caliper mounting surface 72A is perpendicular to the caliper-mounting center axis A21. The caliper mounting surface 72A is perpendicular to the additional caliper-mounting center axis A22.

However, the caliper mounting surface 72A can be non-parallel to the rotational axis RA in the mounting state if needed and/or desired. The caliper mounting surface 72A can be non-parallel to the axle-coupling center axis A1 if needed and/or desired. The caliper mounting surface 72A can be non-parallel to the frame-coupling center axis A3 if needed and/or desired. The caliper mounting surface 72A can be non-perpendicular to at least one of the caliper-mounting center axis A21 and the additional caliper-mounting center axis A22 if needed and/or desired.

As seen in FIG. 6, the first caliper mounting surface 72B is non-perpendicular to the rotational axis RA. The first caliper mounting surface 72B extends along the rotational axis RA. The first caliper mounting surface 72B is non-perpendicular to the axle-coupling center axis A1. The first caliper mounting surface 72B extends along the axle-coupling center axis A1. The first caliper mounting surface 72B is non-perpendicular to the frame-coupling center axis A3. The first caliper mounting surface 72B extends along the frame-coupling center axis A3.

In the present embodiment, the first caliper mounting surface 72B is parallel to the rotational axis RA in the mounting state. The first caliper mounting surface 72B is parallel to the axle-coupling center axis A1. The first caliper mounting surface 72B is parallel to the frame-coupling center axis A3. The first caliper mounting surface 72B is perpendicular to the caliper-mounting center axis A21.

However, the first caliper mounting surface 72B can be non-parallel to the rotational axis RA in the mounting state if needed and/or desired. The first caliper mounting surface 72B can be non-parallel to the axle-coupling center axis A1 if needed and/or desired. The first caliper mounting surface 72B can be non-parallel to the frame-coupling center axis A3 if needed and/or desired. The first caliper mounting surface 72B can be non-perpendicular to the caliper-mounting center axis A21 if needed and/or desired.

As seen in FIG. 7, the second caliper mounting surface 72C is non-perpendicular to the rotational axis RA. The second caliper mounting surface 72C extends along the rotational axis RA. The second caliper mounting surface 72C is non-perpendicular to the axle-coupling center axis A1. The second caliper mounting surface 72C extends along the axle-coupling center axis A1. The second caliper mounting surface 72C is non-perpendicular to the frame-coupling center axis A3. The second caliper mounting surface 72C extends along the frame-coupling center axis A3.

In the present embodiment, the second caliper mounting surface 72C is parallel to the rotational axis RA in the mounting state. The second caliper mounting surface 72C is parallel to the axle-coupling center axis A1. The second caliper mounting surface 72C is parallel to the frame-coupling center axis A3. The second caliper mounting surface 72C is perpendicular to the additional caliper-mounting center axis A22.

However, the second caliper mounting surface 72C can be non-parallel to the rotational axis RA in the mounting state if needed and/or desired. The second caliper mounting surface 72C can be non-parallel to the axle-coupling center axis A1 if needed and/or desired. The second caliper mounting surface 72C can be non-parallel to the frame-coupling center axis A3 if needed and/or desired. The second caliper mounting surface 72C can be non-perpendicular to the additional caliper-mounting center axis A22 if needed and/or desired.

Figure 9:
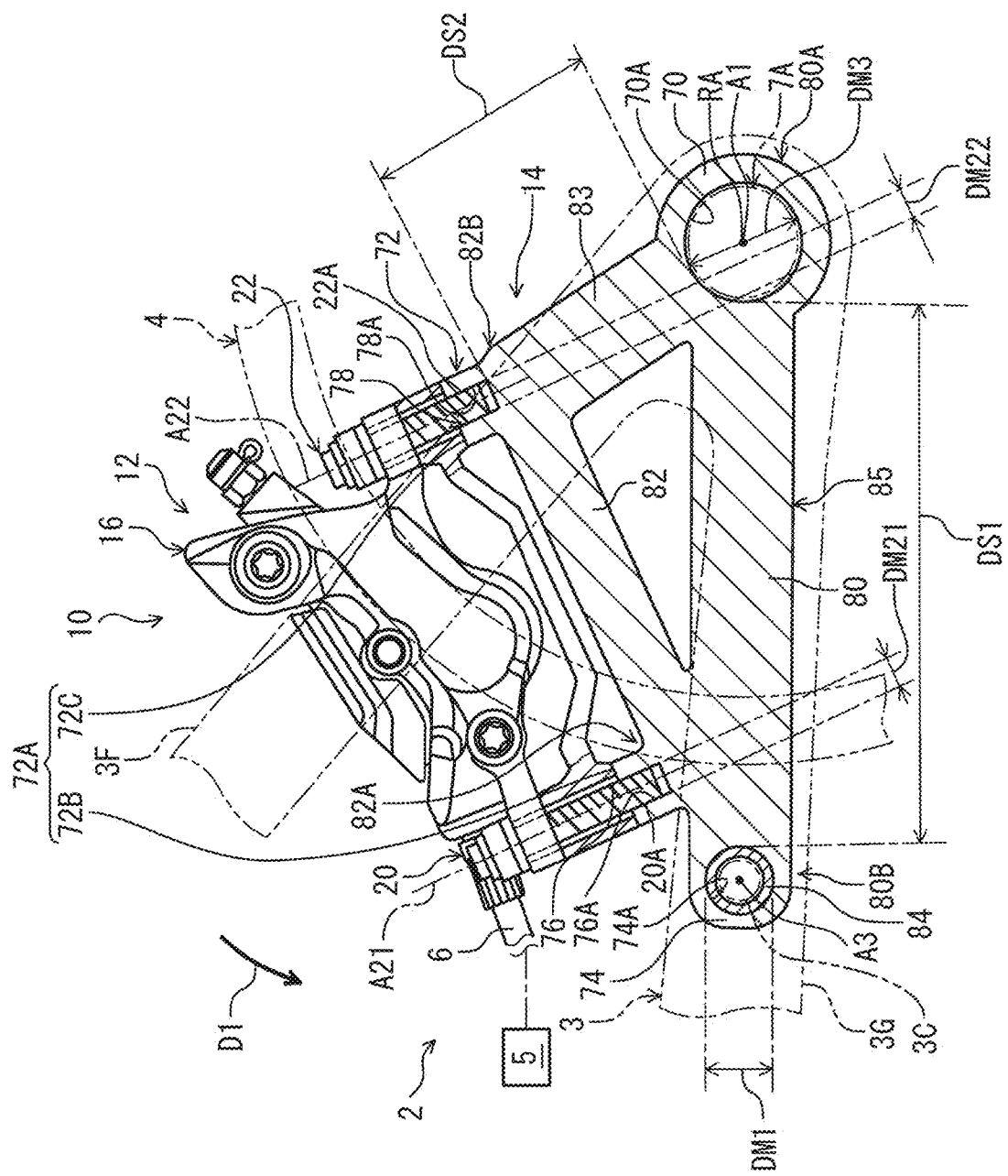
FIG. 9 is a partial plan view of a human-powered vehicle including a disc brake caliper assembly in accordance with a first modification, with a cross-section of a caliper adaptor of the disc brake caliper assembly.

In the above embodiment and the modifications thereof, as seen in FIG. 1, the protrusion 3C of the vehicle body 3 is provided to the first frame 3F. The frame coupling portion 74 is coupled to the protrusion 3C of the first frame 3F. As seen in FIG. 9, however, the protrusion 3C can be provided to the second frame 3G if needed and/or desired. The frame coupling portion 74 can be coupled to the second frame 3G if needed and/or desired.

Figure 10:
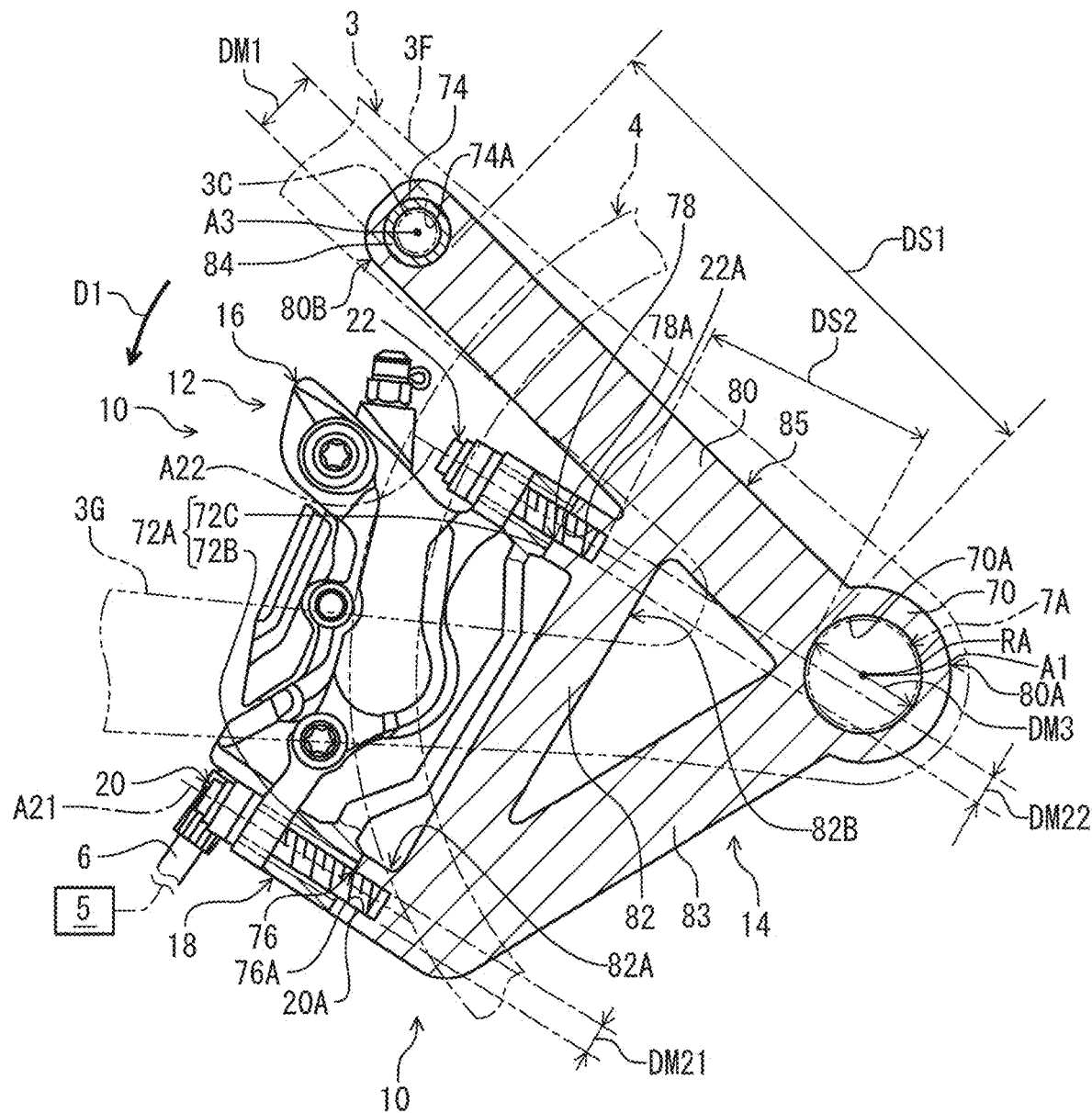
FIG. 10 is a partial plan view of a human-powered vehicle including a disc brake caliper assembly in accordance with a first modification, with a cross-section of a caliper adaptor of the disc brake caliper assembly.
Figure 11:
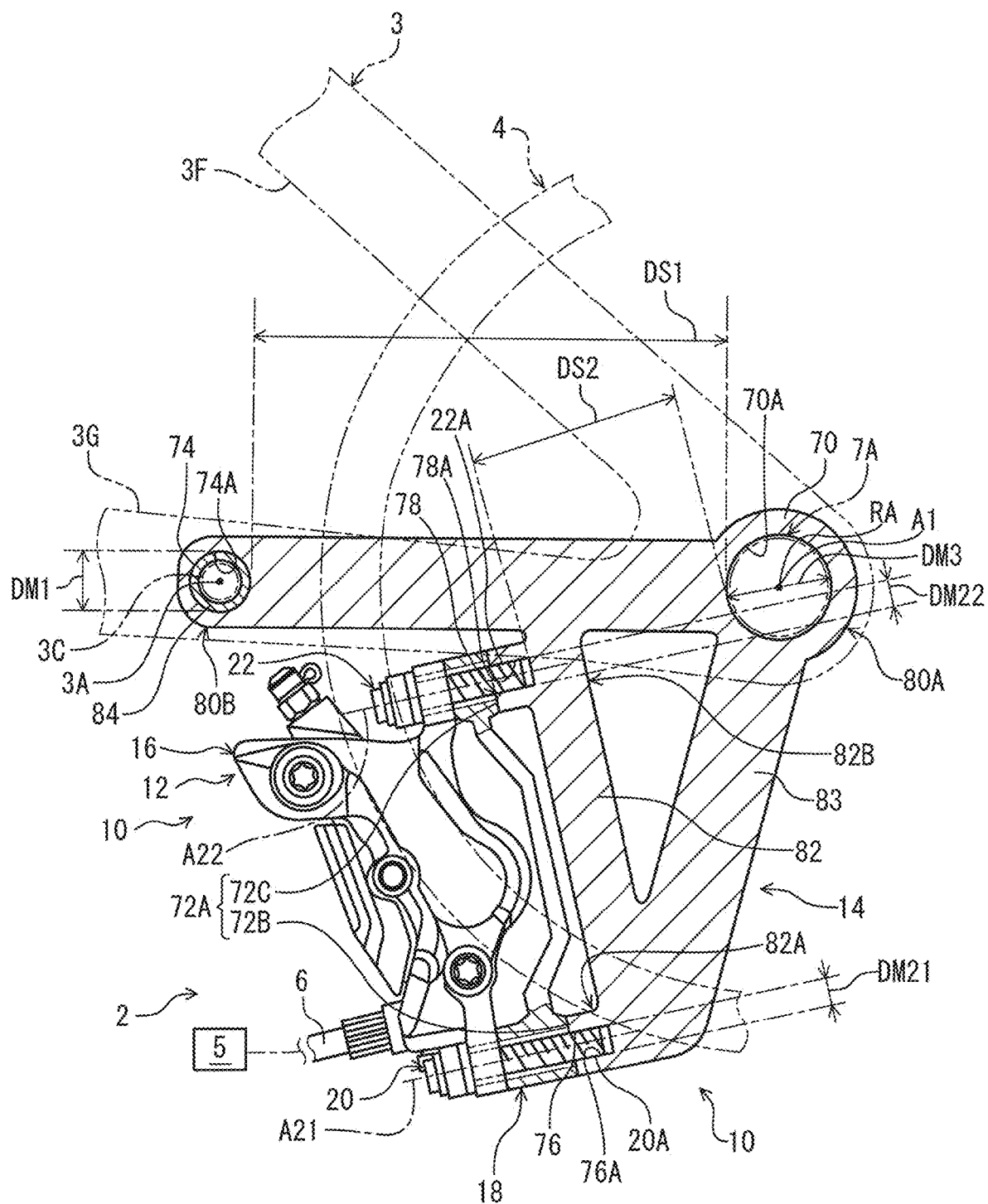
FIG. 11 is a partial plan view of a human-powered vehicle including a disc brake caliper assembly in accordance with a first modification, with a cross-section of a caliper adaptor of the disc brake caliper assembly.

In the above embodiment and the modifications thereof, as seen in FIGS. 1 and 9, the disc brake caliper 12 is provided on an upstream side of the frame coupling portion 74 in the driving rotational direction D1. As seen in FIGS. 10 and 11, however, the disc brake caliper 12 can be provided on a downstream side of the frame coupling portion 74 in the driving rotational direction D1 if needed and/or desired.

Figure 12:
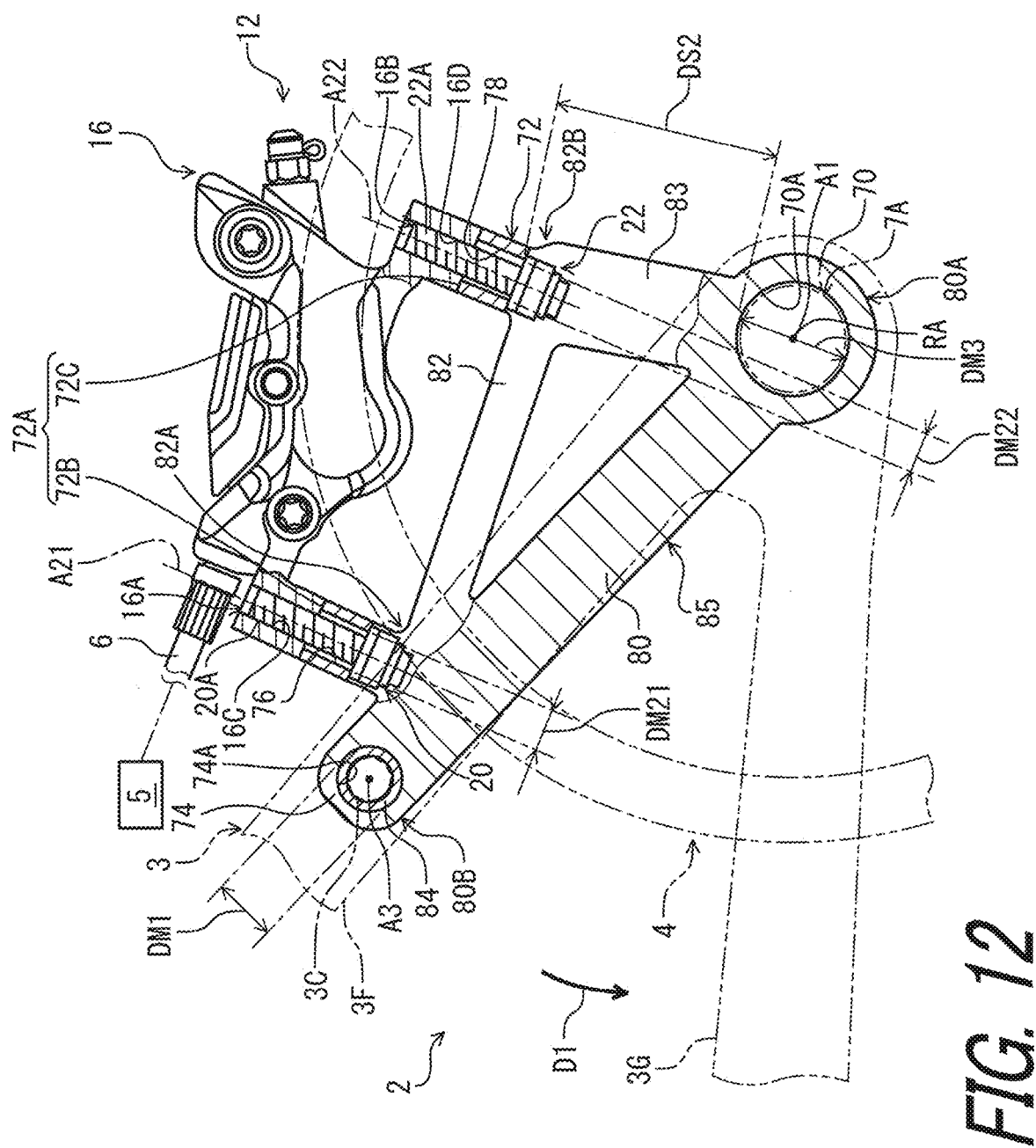
FIG. 12 is a partial plan view of a human-powered vehicle including a disc brake caliper assembly in accordance with a first modification, with a cross-section of a caliper adaptor of the disc brake caliper assembly.

In the above embodiment and the modifications thereof, As seen in FIGS. 1 and 9, the caliper mounting hole 76 includes the internal threaded portion 76A. The additional caliper mounting hole 78 includes the internal threaded portion 78A. As seen in FIG. 12, however, the caliper mounting hole 76 can be configured not to engage with the caliper fastener 20 configured to fasten the disc brake caliper 12 to the caliper adaptor 14 in the mounting state where the disc brake caliper 12 is coupled to the caliper adaptor 14. The additional caliper mounting hole 78 can be configured not to engage with the additional caliper fastener 22 configured to fasten the disc brake caliper 12 to the caliper adaptor 14 in the mounting state where the disc brake caliper 12 is coupled to the caliper adaptor 14. Namely, in the modification depicted in FIG. 12, each of the caliper mounting hole 76 and the additional caliper mounting hole 78 is free of an internal threaded portion. Instead, the first caliper hole 16A includes an internal threaded portion 16C, and the second caliper hole 16B includes an internal threaded portion 16D. The internal threaded portion 16C of the first caliper hole 16A is configured to engage with the external threaded portion 20A of the caliper fastener 20. The internal threaded portion 16D of the second caliper hole 16B is configured to engage with the external threaded portion 22A of the additional caliper fastener 22. In the modification illustrated in FIG. 12, the intermediate member 18 is omitted from the disc brake caliper assembly 10. However, disc brake caliper assembly 10 can include the intermediate member 18 as with the first embodiment if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B"

encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A caliper adaptor for a disc brake caliper of a human-powered vehicle, comprising:
    an axle coupling portion configured to be coupled to a hub axle of a hub assembly of the human-powered vehicle, the hub axle extending along a rotational axis of the hub assembly;
    a caliper mounting portion configured to mount the disc brake caliper, the caliper mounting portion including a caliper mounting hole, the caliper mounting hole having a caliper-mounting center axis, the caliper-mounting center axis extending along a reference plane perpendicular to the rotational axis;
    a frame coupling portion configured to be coupled to a vehicle body of the human-powered vehicle, the frame coupling portion being at least partially provided radially outwardly of the caliper mounting portion relative to the rotational axis; and
    a first frame linearly extending between the axle coupling portion and the frame coupling portion as viewed along the rotational axis.

2. The caliper adaptor according to claim 1, wherein
the frame coupling portion includes a frame coupling hole in which a protrusion of the vehicle body is to be at least partially provided, and
the frame coupling hole is at least partially provided radially outwardly of the caliper mounting portion relative to the rotational axis.

3. The caliper adaptor according to claim 2, wherein
the axle coupling portion includes an axle coupling hole in which the hub axle is to be at least partially provided, and
the frame coupling hole is at least partially provided radially outwardly of the axle coupling hole relative to the rotational axis.

4. The caliper adaptor according to claim 3, wherein
the caliper mounting portion is at least partially provided radially outwardly of the axle coupling hole relative to the rotational axis.

5. The caliper adaptor according to claim 4, wherein
the caliper mounting portion includes an additional caliper mounting hole,
the additional caliper mounting hole has an additional caliper-mounting center axis spaced apart from the caliper-mounting center axis, and
the frame-coupling center axis is non-parallel to the additional caliper-mounting center axis.

6. The caliper adaptor according to claim 5, wherein
the additional caliper-mounting center axis is parallel to the caliper-mounting center axis.

7. The caliper adaptor according to claim 5, wherein
the additional caliper-mounting center axis extends along a reference plane perpendicular to the rotational axis.

8. The caliper adaptor according to claim 2, wherein
the frame coupling hole has a first diameter,
the caliper mounting hole has a second diameter, and the first diameter is larger than the second diameter.

9. The caliper adaptor according to claim 2, wherein
the caliper mounting hole includes an internal threaded portion configured to engage with a caliper fastener configured to fasten the disc brake caliper to the caliper adaptor.

10. The caliper adaptor according to claim 2, wherein
the caliper mounting hole is configured not to engage with a caliper fastener configured to fasten the disc brake caliper to the caliper adaptor.

11. The caliper adaptor according to claim 1, wherein
the frame coupling portion includes a frame coupling hole in which a protrusion of the vehicle body is to be at least partially provided,
the frame coupling hole has a frame-coupling center axis, and
the frame-coupling center axis is non-parallel to the caliper-mounting center axis.

12. The caliper adaptor according to claim 11, wherein
the axle coupling portion includes an axle coupling hole in which the hub axle is to be at least partially provided,
the axle coupling hole has an axle-coupling center axis, and
the axle-coupling center axis is non-parallel to the caliper-mounting center axis.

13. The caliper adaptor according to claim 12, wherein
the frame-coupling center axis is parallel to the axle-coupling center axis.

14. The caliper adaptor according to claim 1, wherein
the first frame includes a first frame end and a first additional frame end,
the first frame extends between the first frame end and the first additional frame end,
the axle coupling portion is provided at the first frame end, and
the frame coupling portion is provided at the first additional frame end.

15. The caliper adaptor according to claim 14, further comprising
a second frame coupled to the first frame, wherein
the caliper mounting portion is provided to the second frame.

16. The caliper adaptor according to claim 15, wherein
the second frame is integrally provided with the first frame as a one-piece unitary member.

17. The caliper adaptor according to claim 1, wherein
the caliper mounting portion includes a caliper mounting surface contactable with the disc brake caliper, and
the caliper mounting surface is non-perpendicular to the rotational axis.

18. The caliper adaptor according to claim 17, wherein
the caliper mounting surface extends along the rotational axis.

19. The caliper adaptor according to claim 1, wherein
a first distance is defined between the axle coupling portion and the frame coupling portion,
a second distance is defined between the axle coupling portion and the caliper mounting portion, and
the first distance is longer than the second distance.

20. The caliper adaptor according to claim 1, wherein
the frame coupling portion is at least partially provided radially outwardly of the axle coupling portion relative to the rotational axis.

21. The caliper adaptor according to claim 1, wherein the caliper mounting portion is at least partially provided radially outwardly of the axle coupling portion relative to the rotational axis.

22. A disc brake caliper assembly for a human-powered vehicle, comprising:
a disc brake caliper comprising:
a caliper body including a cylinder hole;
a piston movably provided in the cylinder hole; and
a brake pad movable relative to the caliper body; and
the caliper adaptor according to claim 1, the caliper adaptor being a separate member from the caliper body, the caliper body being mounted to the caliper mounting portion of the caliper adaptor.

23. A disc brake caliper assembly for a human-powered vehicle, comprising:
a disc brake caliper comprising:
a caliper body including a cylinder hole;
a piston movably provided in the cylinder hole;
a brake pad movable relative to the caliper body; and
an intermediate member; and
a caliper adaptor comprising:
an axle coupling portion configured to be coupled to a hub axle of a hub assembly of the human-powered vehicle, the hub axle extending along a rotational axis of the hub assembly;
a caliper mounting portion configured to mount the disc brake caliper, the caliper mounting portion including a caliper mounting hole, the caliper mounting hole having a caliper-mounting center axis, the caliper-mounting center axis extending along a reference plane perpendicular to the rotational axis; and
a frame coupling portion configured to be coupled to a vehicle body of the human-powered vehicle, the frame coupling portion being at least partially provided radially outwardly of the caliper mounting portion relative to the rotational axis, the caliper adaptor being a separate member from the caliper body, the caliper body being mounted to the caliper mounting portion of the caliper adaptor,
the intermediate member being configured to be provided between the caliper body and the caliper adaptor in a mounting state where the disc brake caliper is mounted to the vehicle body via the caliper adaptor.

24. A caliper adaptor for a disc brake caliper of a human-powered vehicle, comprising:
an axle coupling portion configured to be coupled to a hub axle of a hub assembly of the human-powered vehicle, the hub axle extending along a rotational axis of the hub assembly;
a caliper mounting portion configured to mount the disc brake caliper, the caliper mounting portion including a caliper mounting hole, the caliper mounting hole having a caliper-mounting center axis, the caliper-mounting center axis extending along a reference plane perpendicular to the rotational axis;
a frame coupling portion configured to be coupled to a vehicle body of the human-powered vehicle, the frame coupling portion being at least partially provided radially outwardly of the caliper mounting portion relative to the rotational axis;
a first frame including a first frame end and a first additional frame end, the first frame extending between the first frame end and the first additional frame end, the axle coupling portion being provided at the first frame end, the frame coupling portion being provided at the first additional frame end;
a second frame coupled to the first frame, the caliper mounting portion being provided to the second frame; and
a third frame coupled to the first frame and the second frame, the third frame extending between the first frame and the second frame, the third frame being coupled to the first frame end of the first frame, the third frame being coupled to the second additional frame end of the second frame.

* * * * *